(12) United States Patent
Nelson

(10) Patent No.: US 8,046,716 B2
(45) Date of Patent: Oct. 25, 2011

(54) CREATING, DISPLAYING, AND EDITING A SUB-PROCESS WITHIN A PROCESS DIAGRAM

(75) Inventor: Mark Nelson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1154 days.

(21) Appl. No.: 11/763,809

(22) Filed: Jun. 15, 2007

(65) Prior Publication Data

US 2008/0313573 A1 Dec. 18, 2008

(51) Int. Cl.
*G06F 3/00* (2006.01)
*G06F 3/048* (2006.01)
*G06F 9/44* (2006.01)

(52) U.S. Cl. ......... 715/837; 715/763; 715/835; 717/109

(58) Field of Classification Search .................. 715/763, 715/764, 765, 835, 967, 837, 853, 854, 855; 717/100, 106–109
See application file for complete search history.

(56) References Cited

U.S. PATENT DOCUMENTS

| | | | |
|---|---|---|---|
| 6,122,634 A | 9/2000 | Brodsky | |
| 6,425,121 B1 | 7/2002 | Phillips | |
| 6,469,723 B1 * | 10/2002 | Gould et al. | 715/837 |
| 6,532,471 B1 | 3/2003 | Ku et al. | |
| 6,782,528 B1 | 8/2004 | Bennett et al. | |
| 6,931,625 B1 * | 8/2005 | Coad et al. | 717/109 |
| 7,110,936 B2 | 9/2006 | Hiew et al. | |
| 7,451,403 B1 * | 11/2008 | Srinivasan et al. | 715/763 |
| 7,479,970 B2 * | 1/2009 | Christman et al. | 345/660 |
| 7,765,496 B2 * | 7/2010 | Bernstein | 715/865 |
| 2003/0041314 A1 | 2/2003 | Heeren et al. | |
| 2004/0107414 A1 | 6/2004 | Bronicki et al. | |
| 2005/0044532 A1 | 2/2005 | Pfander et al. | |
| 2005/0097472 A1 * | 5/2005 | Machida | 715/736 |
| 2005/0197880 A1 * | 9/2005 | Walsh et al. | 705/8 |

FOREIGN PATENT DOCUMENTS

| | | |
|---|---|---|
| EP | 1 679 587 A1 | 7/2006 |
| EP | 1679587 A1 | 7/2006 |
| JP | 07-141437 A | 6/1995 |
| JP | 08-287157 A | 11/1996 |
| JP | 2000-348075 A | 12/2000 |
| JP | 2002-015033 A | 1/2002 |

OTHER PUBLICATIONS

International Search Report dated Oct. 29, 2008 in International Application No. PCT/US2008/065463.

(Continued)

*Primary Examiner* — Xiomar L Bautista
(74) *Attorney, Agent, or Firm* — Hope Baldauff Hartman, LLC

(57) ABSTRACT

Technologies are described herein for creating, displaying, and editing a sub-process within a process diagram. A diagramming application provides for the grouping of existing process operations of a process diagram into a sub-process. The sub-process is displayed within the process diagram as a container that may be expanded and collapsed in-place within the diagram to display or hide the corresponding sub-process operations without leaving the context of the process diagram. Similarly, a single process operation within a process diagram may be selected for the creation of an associated sub-process. An expanded container including the newly created sub-process operations and a collapsed container representing the sub-process operations replace the single process operation and are concurrently hidden and displayed according to a user selection of a collapse or expand control.

20 Claims, 15 Drawing Sheets

OTHER PUBLICATIONS

"Expanding and Collapsing Local Subprocesses", retrieved on Apr. 3, 2007 at <<http://publib.boulder.ibm.com/infocenter/dmndhelp/v6rxmx/index.jsp?topic=/com.ibm.btools.help.modeler.doc/doc/tasks/modeling/expandingandcollapsingsubprocesses.html>>p. 1.

Turetken, "Supporting Systems Analysis and Design Through Fisheye Views", vol. 47, Issue 9, ACM Press, 2004, pp. 72-77.

Turetken, "The Use of Fisheye View Visualizations in Understanding Business Process", ECIS, Jun. 6-8, 2002, pp. 1-9.

"European Search Report", Mailed Date: Feb. 3, 2011, Application No. EP/08756581.8, pp. 8.

"Simulink. Model-Based and System-Based Design", Jan. 1, 2004, pp. 488.

"Simulink: Model-based and System-based Design" Oct. 2004, The MathWorks, Version 5, 488 pages.

Supplemental European Search Report dated Feb. 3, 2011 in European Application No. 08756581.8.

Chinese Official Action dated Aug. 3, 2011 in Chinese Application No. 20880019999.70.

\* cited by examiner

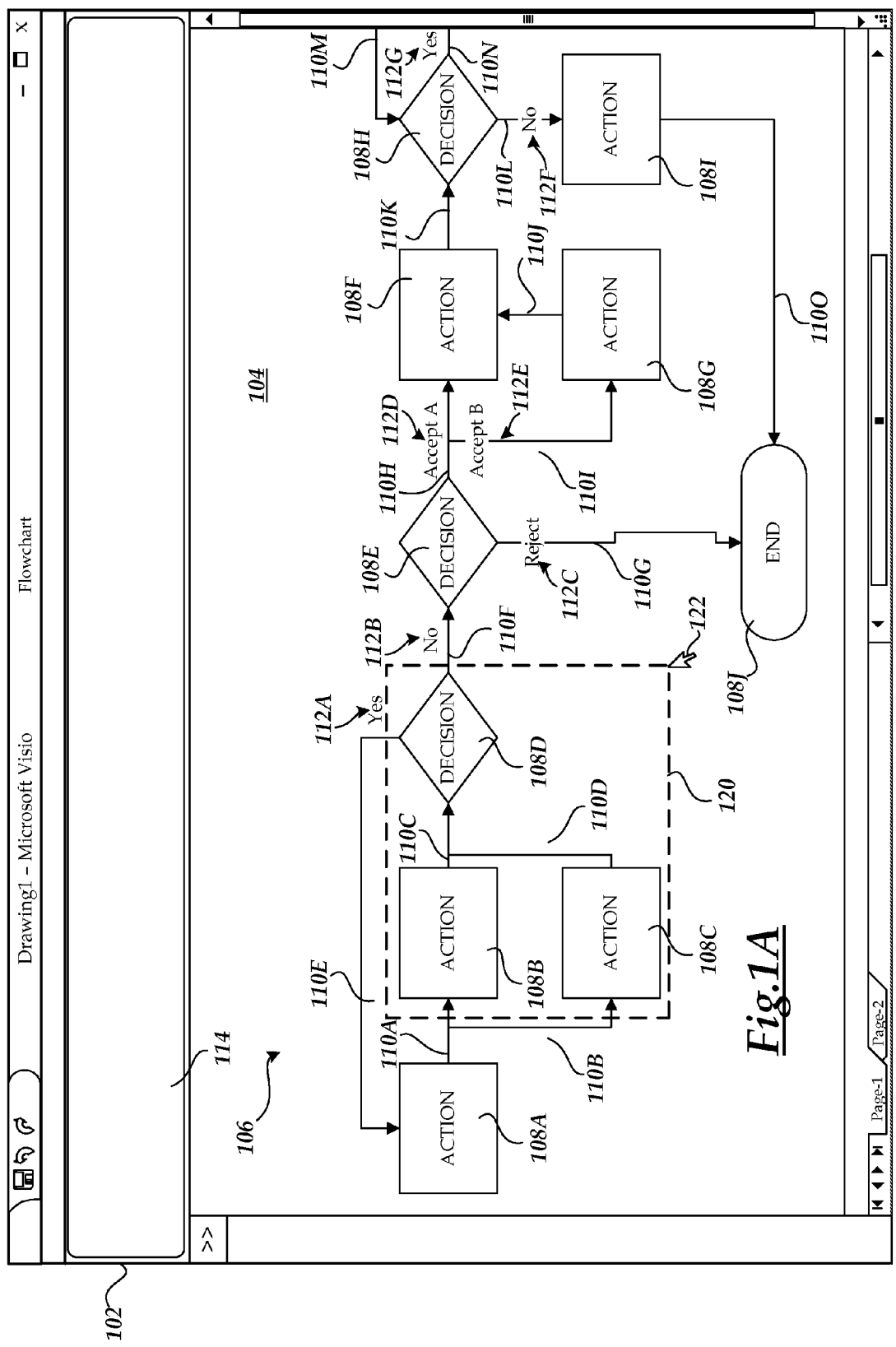

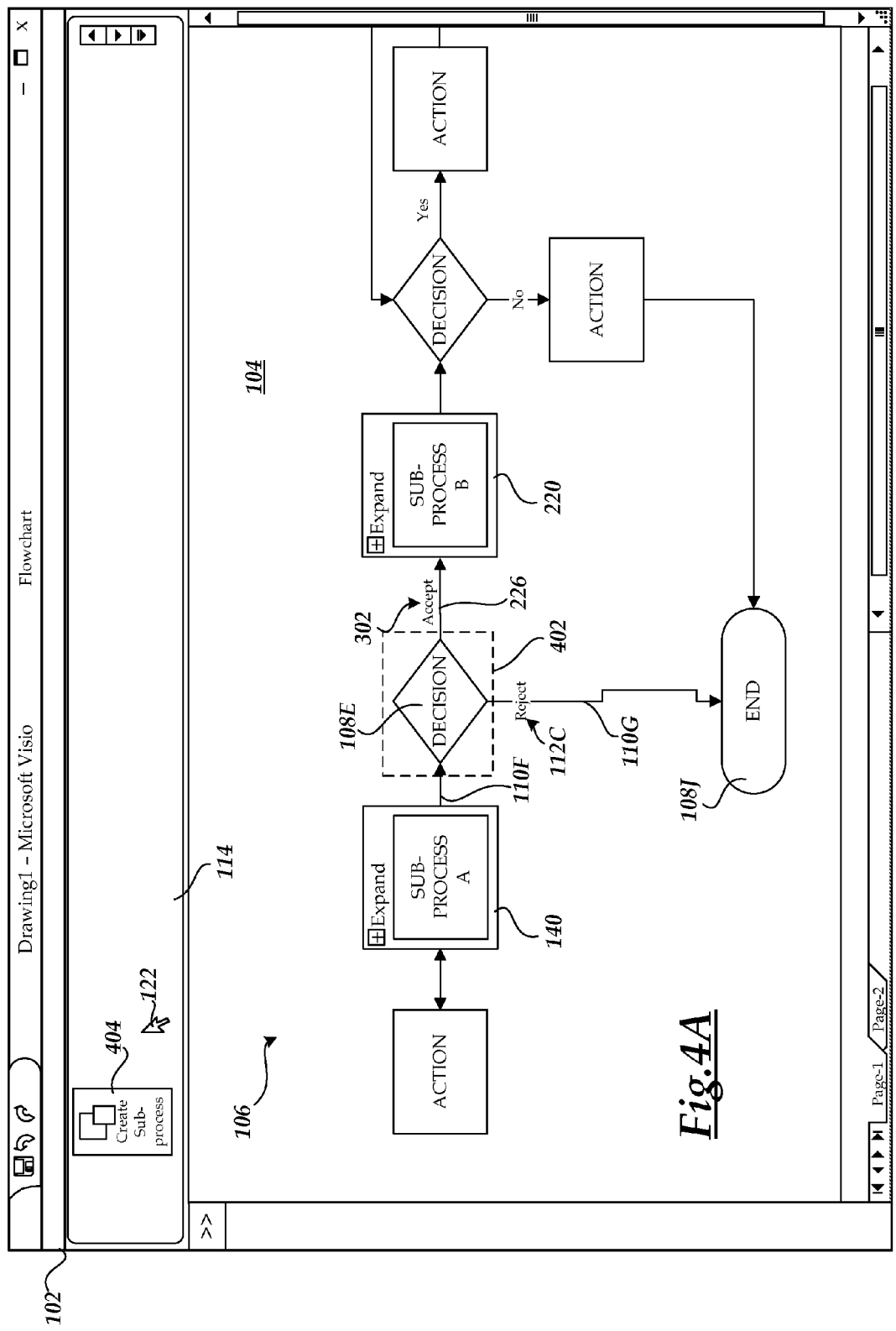

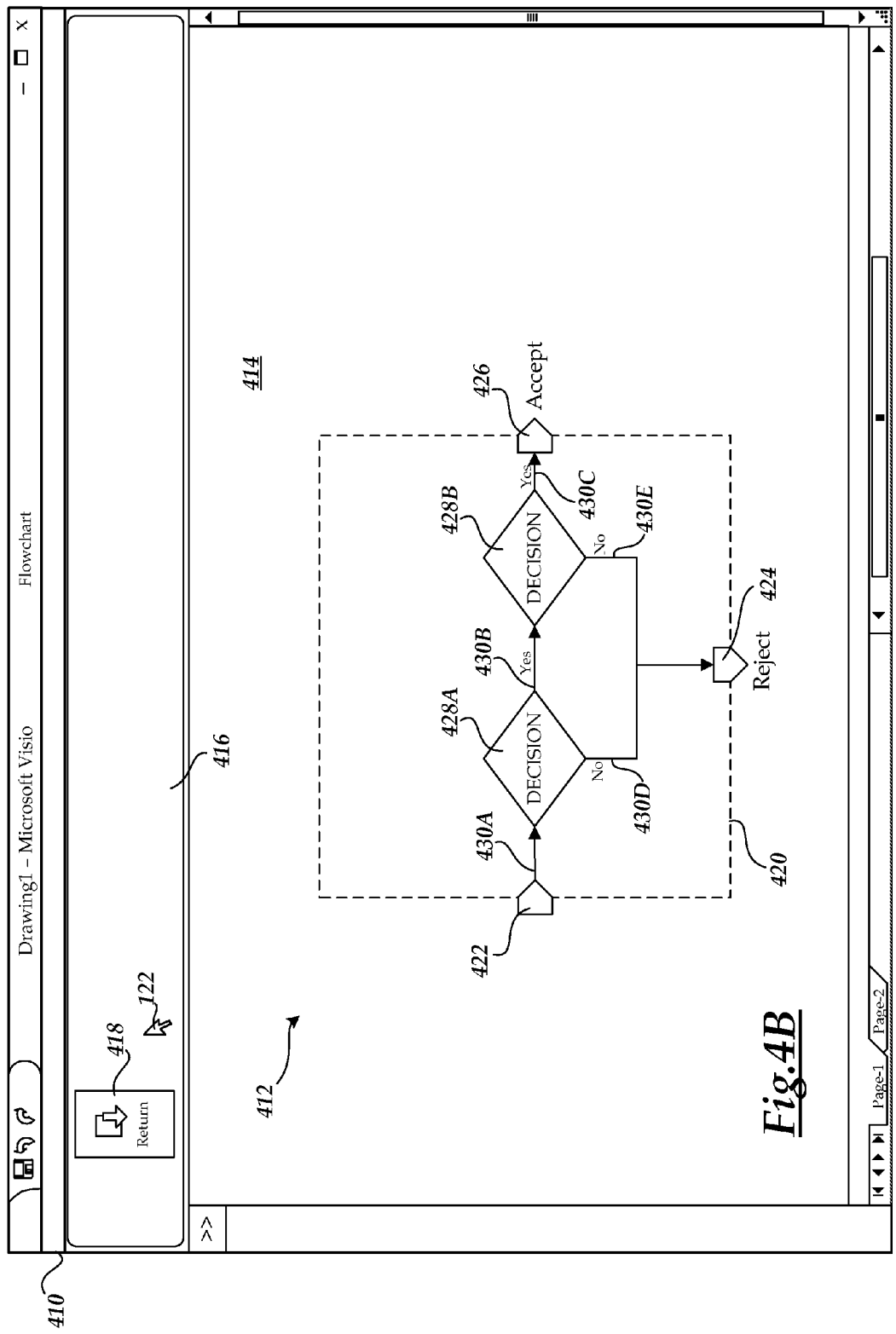

CREATING, DISPLAYING, AND EDITING A SUB-PROCESS WITHIN A PROCESS DIAGRAM

BACKGROUND

Many diagramming applications allow for the creation of a flowchart to illustrate a business process. Typically, specific shapes are used in the flowchart to identify various types of steps within the process. For example, a rectangle may identify an action step in the process, while a diamond represents a decision step in the process. Often, in order to simplify complex flowcharts, a single step in the process may be used to represent a sub-process that includes any number of additional steps. Diagramming applications may provide for a unique shape that represents a sub-process to be used in the flowchart that is linked to a separate diagram on a separate page for the sub-process. To view the details of the sub-process from the flowchart a user must navigate to the separate diagram. Navigating between diagrams is cumbersome and forces the user to leave the context of the overall diagram.

It is with respect to these considerations and others that the disclosure made herein is provided.

SUMMARY

Technologies are described herein for creating, displaying, and editing sub-processes within a flowchart or process diagram. Through the utilization of the concepts presented herein, a diagramming application, or other type of application program, can create sub-process diagrams that may be expanded or collapsed in-place within a process diagram. In this manner, a sub-process may be expanded within the process diagram to show the constituent steps, or sub-process operations, or collapsed to a single process operation within the process diagram.

According to one aspect presented herein, a diagramming application provides for displaying an expanded container within a process diagram that encompasses multiple process operations that define a sub-process. The expanded container includes a selectable collapse control, that when selected, operates to hide the expanded container and display a collapsed container that represents the sub-process as a single process operation. According to further aspects, multiple process operations of a process diagram may be grouped together to create a sub-process. A collapsed container is created to represent the sub-process. An expanded container is created that includes the multiple process operations of the process diagram that make up the sub-process. When the collapsed container is displayed within the process diagram, the expanded container is hidden. Similarly, when the expanded container is displayed within the process diagram, the collapsed container is hidden.

According to implementations, when creating and displaying the collapsed container, the diagramming application determines whether there is more than one connector coming into the expanded sub-process and whether there is more than one connector going out of the expanded sub-process. If more than one incoming or outgoing connector exists, then the diagramming application hides the multiple incoming or outgoing crossing connectors when collapsing the sub-process and displays one or more aggregated connectors that combine multiple connectors. Similarly, aggregated connectors may include concatenated labels associated with the labels of the multiple connectors, or a new label provided by a user.

Aspects further include creating a sub-process associated with a single process operation in the process diagram. When a request is received to create the sub-process, a sub-process creation workspace is presented to a user. The workspace includes connector anchors that identify crossing connectors associated with the process operation for which the sub-process is being created so that the user may properly connect the sub-process operations to the external process diagram. After receiving the sub-process operations corresponding to the sub-process, the diagramming application creates an expanded container that encompasses the sub-process operations. A collapsed container that includes the process operation being defined as a sub-process is also created. When the collapsed container is displayed within the process diagram, the expanded container is hidden. Likewise, when the expanded container is displayed within the process diagram, the collapsed container is hidden.

It should be appreciated that although the implementations described herein are presented in the context of a diagramming application, any type of program that creates or displays visual representations of a process may utilize the concepts presented herein. The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A-1B are screen diagrams showing one implementation provided herein for creating a sub-process from multiple process operations of a process diagram;

FIGS. 4A-4C are screen diagrams showing aspects of one embodiment provided herein for creating a sub-process corresponding to a process operation within a process diagram;

DETAILED DESCRIPTION

Figure 1B:
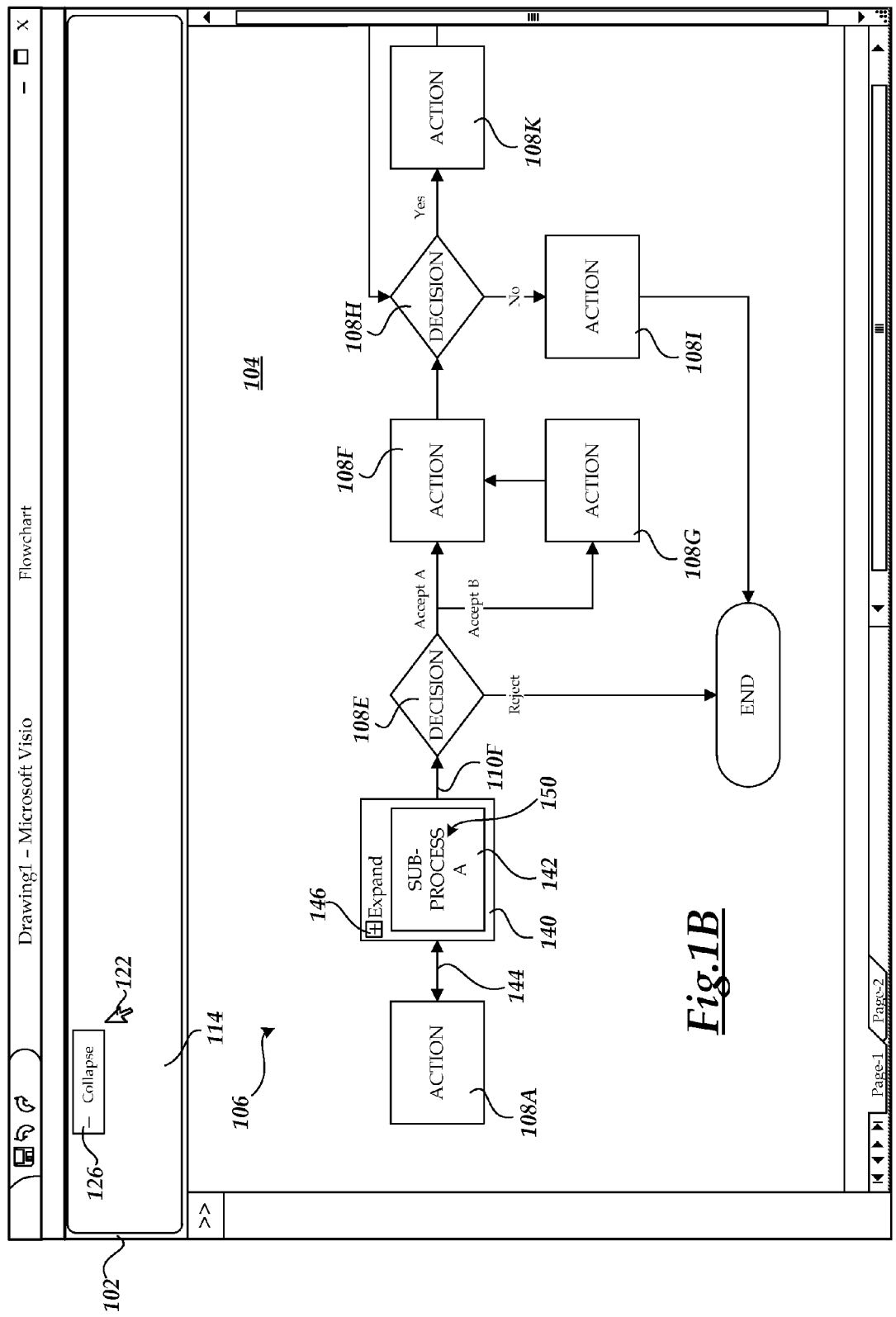

The following detailed description is directed to technologies for creating, displaying, and editing sub-processes within a flowchart or process diagram. Through the use of the embodiments presented herein, a diagramming application can display a sub-process within a process diagram that may be expanded and collapsed in-place within the diagram to display or hide the corresponding sub-process operations without leaving the context of the process diagram. In this manner, a user may view a complex diagram with varying amounts of detail with respect to one or more sub-processes without leaving the diagram.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Aspects of the various implementations will first be described with respect to FIGS. 1A-4C, which show sample screen diagrams from a diagramming application. While the diagramming application described herein is the MICROSOFT OFFICE VISIO 2007 diagramming application from MICROSOFT CORPORATION of Redmond, Wash., it should be appreciated that the disclosure presented herein is equally applicable to all diagramming applications capable of creating and displaying a process diagram.

Referring now to the drawings, in which like numerals represent like elements through the several figures, aspects of a computing system and methodology for creating, displaying, and editing sub-processes within a process diagram will be described. In particular, FIG. 1A shows an illustrative sample complex process diagram 106, created using a diagramming application. The process diagram 106 was created in the workspace 104 of a process diagram page 102. The process diagram 106 includes a number of process operations 108 and corresponding connectors 110. Specifically, the workspace 104 of the process diagram page 102 includes the process operations 108A-108J and the connectors 110A-110O. It should be noted that because the process diagram 106 is too expansive to be viewed in its entirety within the process diagram page 102, the process diagram 106 also includes additional process operations 108 that cannot be seen within the workspace 104. For example, the process operation 108H is connected via connectors 110M and 110N to additional process operations 108 that are not shown in the workspace 104.

As is common with diagramming applications, the process operations that represent action steps are shown as rectangles, while the process operations that represent decision steps are shown as diamonds. The process diagram 106 additionally includes labels 112A-112G on connectors 110E-110I, 110L, and 110N, which extend from the decision process operations 108D, 108E, and 108H. The diagramming application provides a command area 114 across the top of the workspace 104 that may include any number of controls relating to the creation, editing, and manipulation of the process diagram 106 and any corresponding sub-processes, as described below.

According to the example shown in FIG. 1A, a user is creating a sub-process within the process diagram 106 that includes the three process operations 108B-108D. In doing so, the user first selects a blank area of the workspace 104 above and to the left of the process operations 108B-108D with a mouse or other pointing device and moves an associated cursor 122 down and to the right while holding a mouse button until a container 120 encompasses the desired process operations 108B-108D. After releasing the mouse button, the container 120 will select and appropriately highlight the process operations 108B-108D, as well as any internal connectors. Alternatively, the user may individually select each of the process operations 108B-108D. Once the sub-process creation process is initiated, then the diagramming application will select the corresponding connectors as well.

For the purposes of this disclosure, there are three types of connectors as they relate to a container. An internal connector is a connector that is connected at each end to process operations 108 that are entirely within a container. For example, the connectors 110C and 110D are internal connectors since they are connected to the process operations 108B-108D, which are within the container 120. Crossing connectors have one end connected to a process operation 108 that is inside a container and the other end connected to a process operation 108 that is outside of a container. For example, the connectors 110A, 110B, 110E, and 110F are crossing connectors since they are connected at one end to a process operation 108B, 108C, or 108D that is inside of the container 120 and at the other end to a process operation 108A or 108E that is outside of the container 120. Finally, aggregate connectors have one end connected to a collapsed container and one end connected to a process operation 108 outside of the collapsed container. Aggregate connectors replace multiple crossing connectors that are entering an expanded container or multiple crossing connectors that are exiting an expanded container. A collapsed container provides a representation of a sub-process within a process diagram 106, while an expanded container displays the constituent components of a sub-process within a process diagram 106. Aggregate connectors, collapsed containers, and expanded containers will be described in detail below.

Looking now at FIG. 1B, after the user selects the desired sub-process components with the container 120, then the user may select a "collapse" control 126 within the command area 114, or located elsewhere within the process diagram page 102, to execute a collapsing process. Upon receiving the selection of the "collapse" control 126, the diagramming application groups the contents of the container 120 to form a container group and subsequently hides the process operations 108B-108D, internal connectors 110C and 110D, and crossing connectors 110A and 110B. The diagramming application creates a collapsed container 140 and displays the collapsed container 140 in place of the container 120 within the process diagram 106. The collapsed container 140 includes a collapsed shape 142 that represents a sub-process operation. While the collapsed shape 142 is shown to be a rectangle, which typically denotes an action step, it should be appreciated that any shape may be utilized by the diagramming application.

The collapsed shape includes a sub-process name 150. The user may amend the sub-process name 150 by selecting the collapsed shape 142 and typing a new name, by creating a name after selecting the desired sub-process components from the process diagram 106 and grouping them together, but prior to collapsing the created container as will be described with respect to FIGS. 2A-2C, or by any other means typically used to amend text in a diagramming application. The collapsed container 140 additionally includes an in-diagram "expand" control 146 that operates to hide the collapsed container 140 and to display the sub-process operations 108B-108D that are represented by the collapsed container 140. The in-diagram "expand" control 146 is glued to the collapsed container 140 so that the user does not have to leave the workspace 104 to expand the sub-process. It should be appreciated that one or more additional "expand" controls may be positioned in other locations within the process diagram page 102, internally or externally to the workspace 104.

As described above, upon initiating the collapse action, the diagramming application hides the container 120 and corresponding connectors and creates and displays the collapsed container 140. Additionally, in the example shown in FIG. 1B, the diagramming application creates an aggregate connector 144 to connect the collapsed container 140 to the process operation 108A and attaches the crossing connector 110F to the collapsed container 140. The aggregate connector replaces the crossing connectors 110A, 110B, and 110E shown in FIG. 1A. The aggregate connector is bi-directional to reflect the two different directions of the crossing connectors 110A, 110B, and 110E between the process operations 108A and 108B. According to one implementation, the diagramming application will display a number with each aggregate connector that represents the number of crossing connectors that the aggregate connector is replacing. Because there is only a single crossing connector 110F between the process operations 108D and 108E, the diagramming application may disconnect the crossing connector 110F from the process operation 108D when hiding the container group and reconnect the crossing connector 110F to the collapsed container 140. Alternatively, the crossing connector 110F may be hidden with all other crossing connectors 110A-110E and a new connector created and displayed between the collapsed container 140 and the process operation 108E.

The creation and display of the collapsed container 140 allows the user to simplify the process diagram 106 by displaying a representation of the sub-process A without displaying the constituent components of sub-process A. In collapsing the sub-process A, the diagramming application reformats the process diagram 106 to remove the vacant space in the process diagram 106 left by the hidden components of the sub-process A. As a result, the process operation 108K is now visible on the right side of the workspace 104. As will be described further below, upon subsequent expanding and collapsing of sub-process A and other sub-processes, the diagramming application will reformat the process diagram 106 as required to fill the workspace 104.

Figure 2A:
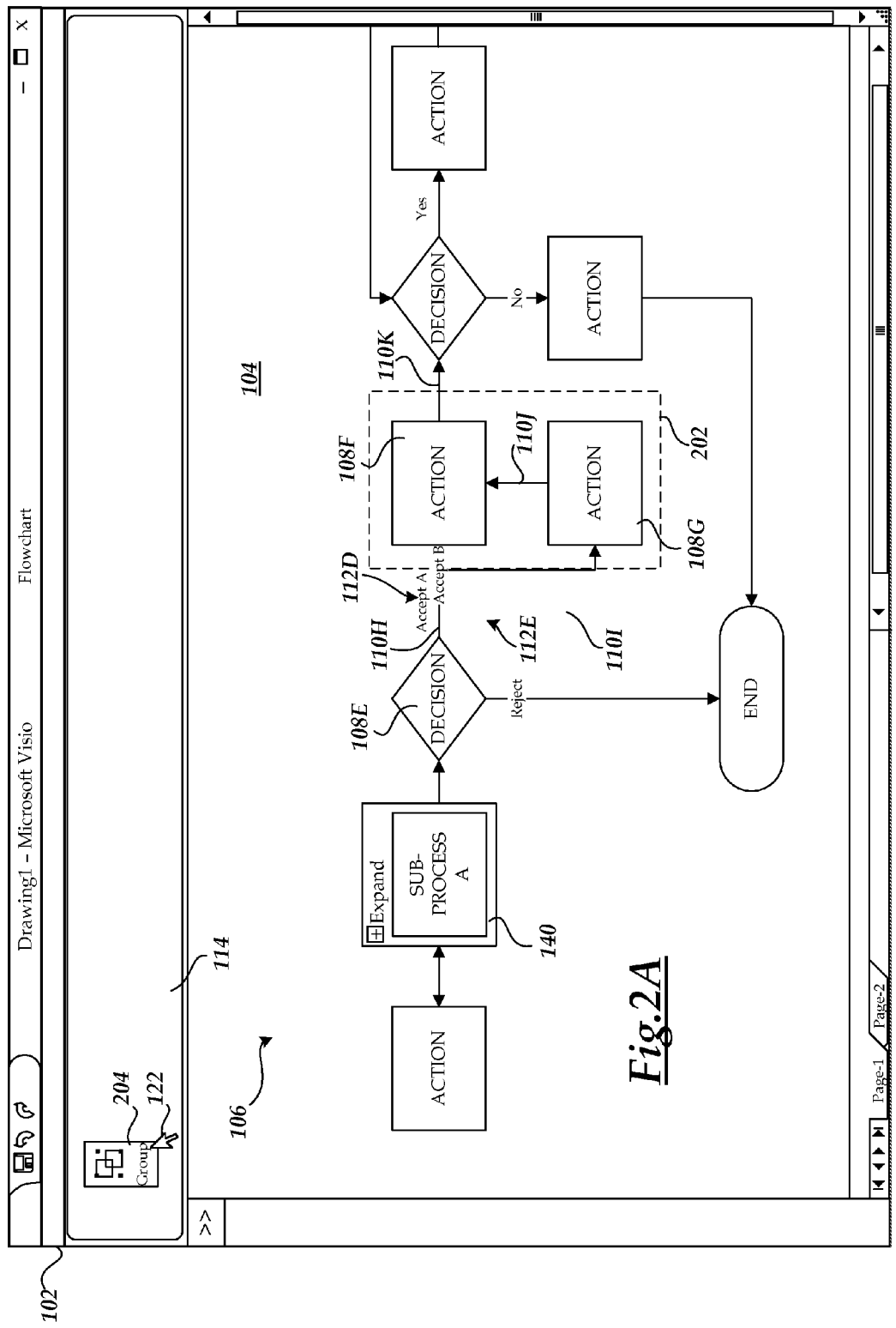
FIGS. 2A-2C are screen diagrams showing a further embodiment provided herein for creating a sub-process from multiple process operations of a process diagram and for labeling connectors corresponding to the sub-process.
Figure 2B:
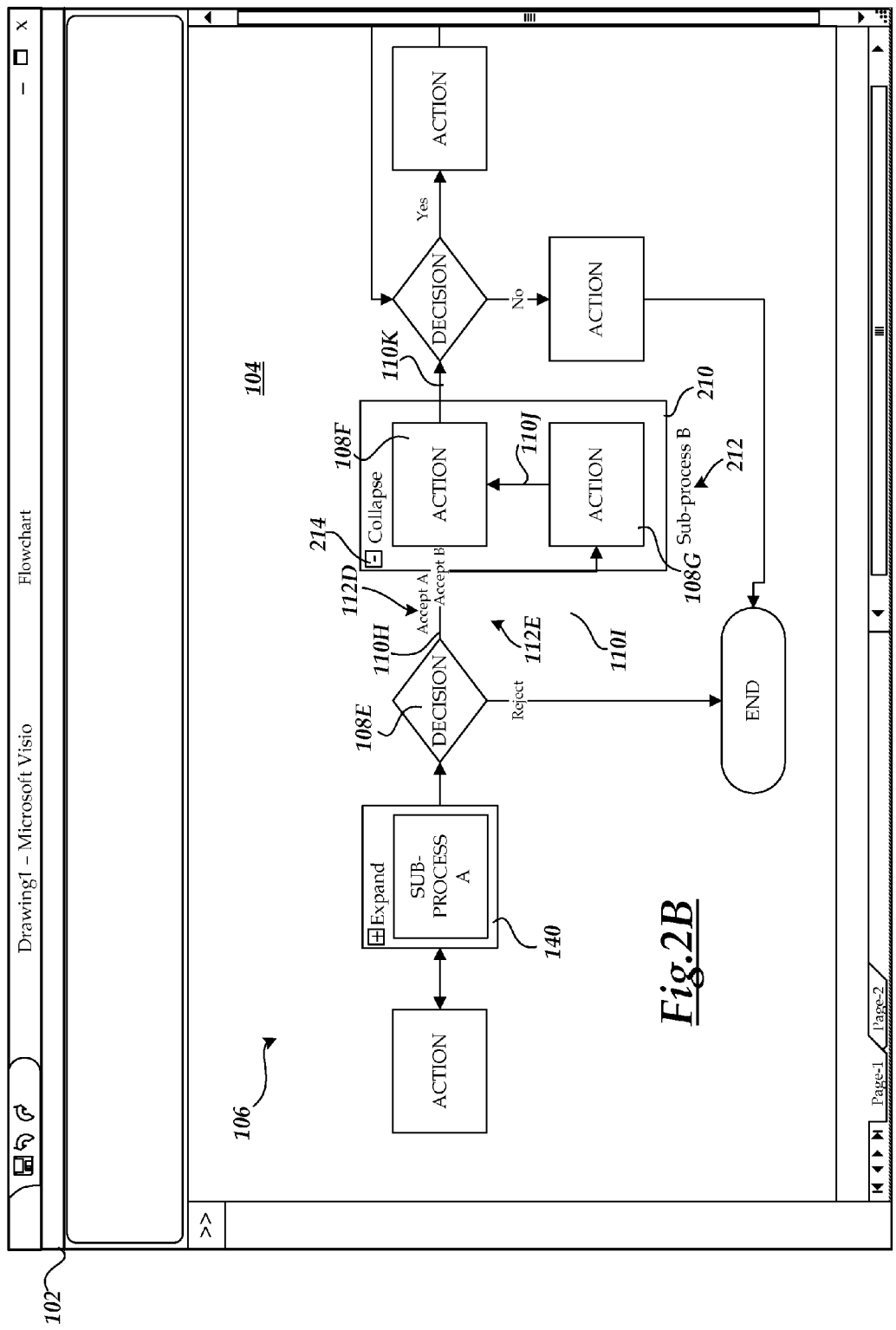

Turning now to FIG. 2A, an alternative embodiment for creating a collapsible sub-process from process operations 108F and 108G of the process diagram 106 will be described. To create the sub-process, the user selects the process operations 108F and 108G as described above to create the container 202. Rather than clicking on the "collapse" control 126 to create a collapsed container within the process diagram 106 that represents the selected sub-process, the user clicks on a "group" control 204 from the command area 114. In response to receiving this selection, the diagramming application will group the contents of the container 202 and create an expanded container 210 around the sub-process operations as shown in FIG. 2B.

The expanded container 210 includes an in-diagram "collapse" control 214 that when selected, triggers the diagramming application to hide the expanded container 210 and its contents, including all internal and crossing connectors. Because a collapsed container corresponding to the expanded container 210 does not yet exist, the diagramming application creates a collapsed container and corresponding aggregate connectors, as appropriate. Subsequent selections of the in-diagram "collapse" control 214 will trigger the diagramming application to hide the expanded container 210 and corresponding connectors and display the previously hidden collapsed container and corresponding connectors. The in-diagram "collapse" control 214 operates similarly to the "collapse" control 126 located within the command area 114 and described above, but is glued to the expanded container 210 so that the user does not have to leave the workspace 104 to collapse the sub-process. Once a collapsed container and an expanded container have been created for any given sub-process, then when one container is displayed, the other container is hidden.

Figure 2C:
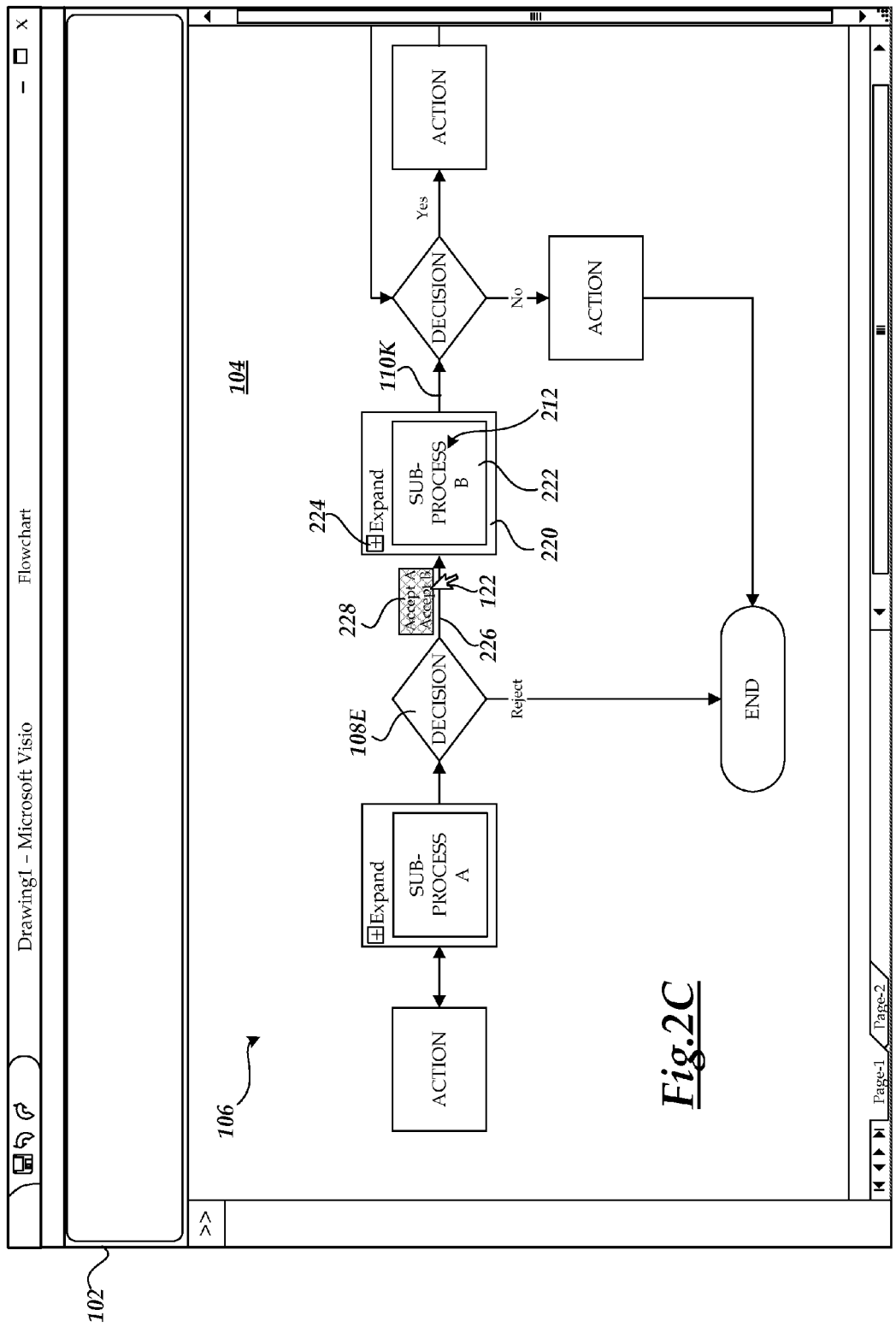

Additionally, the user may label the expanded container 210 with a sub-process name 212. The sub-process name 212 will be displayed in a collapsed shape 222 with a collapsed container 220, as shown in FIG. 2C. The collapsed container 220 includes an in-diagram "expand" control 224 for displaying the hidden expanded container 210 within the process diagram 106 in place of the collapsed container 220. When the diagramming application collapsed sub-process B, the crossing connectors 110H and 110I were replaced with the aggregate connector 226. Because the crossing connectors 110H and 110I each contained a label, the diagramming application concatenates the text from each label, separated by carriage returns. For example, the aggregate connector 226 includes a concatenated label 228 that includes the labels 112D and 112E from crossing connectors 110H and 110I, respectively.

Figure 3A:
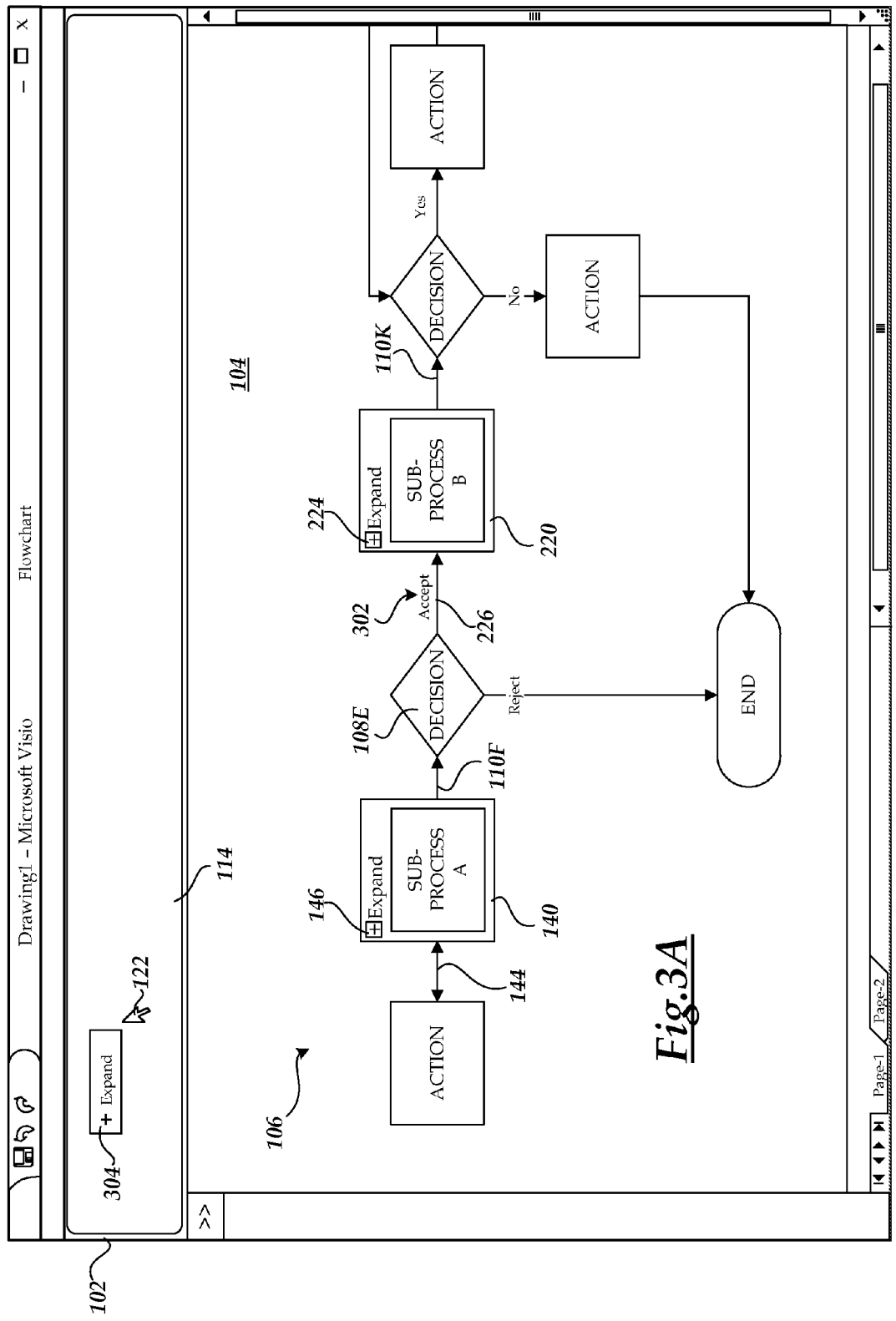
FIGS. 3A-3B are screen diagrams showing aspects of one implementation provided herein for expanding sub-processes for viewing within a process diagram.

The user may select the concatenated label 228 on the aggregate connector 226, as shown in FIG. 2C, and amend the text as desired. As seen in FIG. 3A, the user has amended the text to create a new label 302. It should be noted that when the user amends a label on an aggregate connector, the change does not affect the labels associated with the crossing connectors that are replaced by the aggregate connector when the sub-process is displayed in a collapsed format. For example, if the collapsed container 220 shown in FIG. 3A is expanded, then the label 302 will be hidden along with the aggregate connector 226, and the crossing connectors 110H and 110I and corresponding labels 112D and 112E will be displayed. According to various embodiments, the properties of crossing connectors and aggregate connectors are independent from one another. In other words, any characteristics or formatting that is applied to an aggregate connector or associated label will not affect the corresponding crossing connectors and labels and vice versa. However, according to one implementation, deleting an aggregate connector will automatically delete all of the crossing connectors that the aggregate connector represents. Conversely, deleting a crossing connector will only delete an aggregate connector if there are no other crossing connectors being aggregated.

Figure 3B:
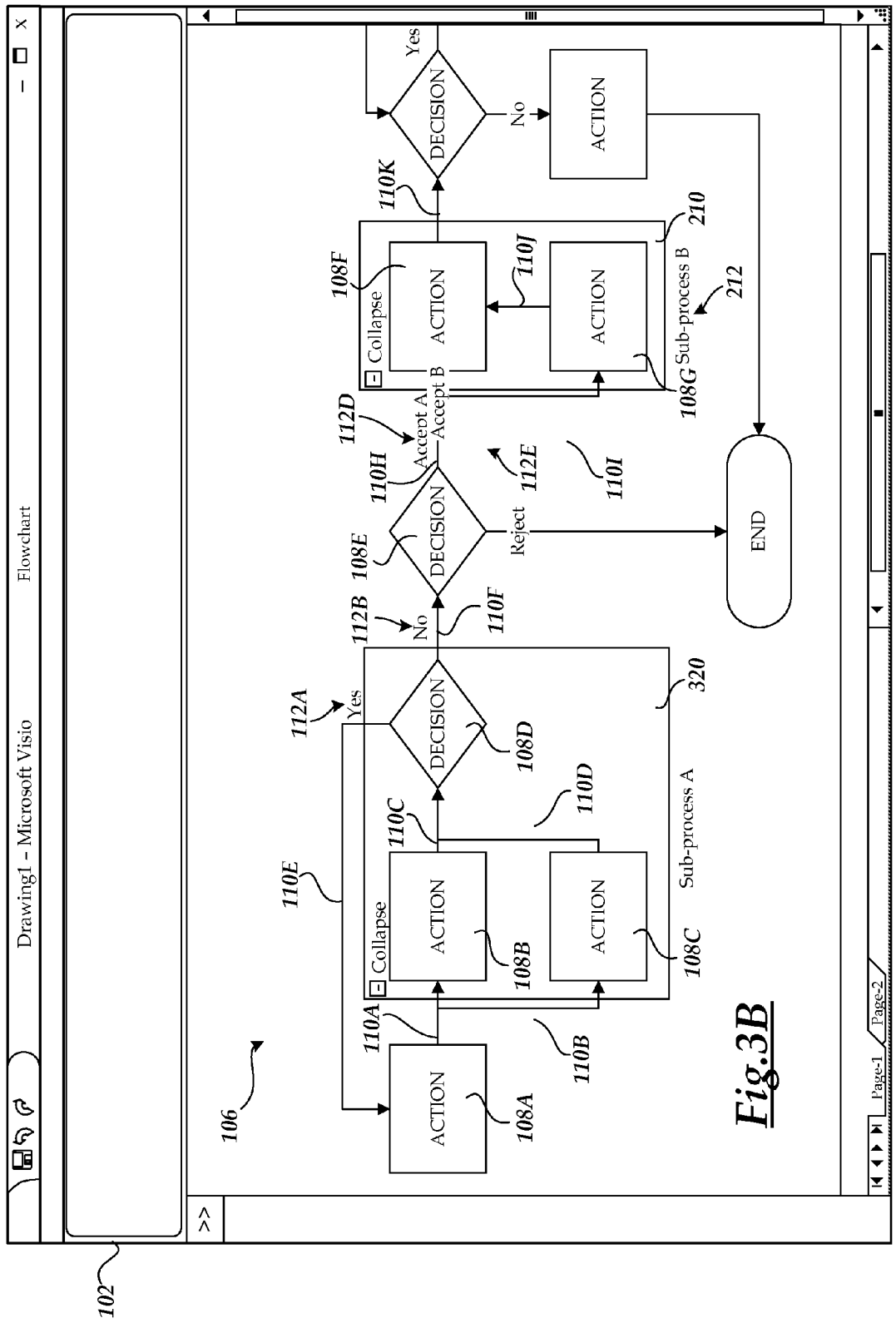

FIG. 3A shows the process diagram 106 described above with sub-process A and sub-process B displayed in a collapsed format. As previously discussed, the user may expand the collapsed containers 140 and 220 by selecting the in-diagram "expand" controls 146 and 224. Alternatively, the user may select an "expand" control 304 within the command area 114 after selecting the collapsed containers 140 and 220. It should be appreciated that the "expand" control 304 may trigger the display of a drop-down menu that contains any number of controls corresponding to various diagram levels. A diagram level may be created each time a sub-process is created. Accordingly, sub-process A would be assigned to level 1 and sub-process B would be assigned to level 2. In this manner, the user may select a specific level, or all levels, in which to expand. Additionally, the user may define a level by assigning each sub-process to a desired level. By selecting a specific level from the drop-down menu, all sub-processes assigned to the selected level will be expanded within the process diagram 106 and the process diagram 106 will be formatted to accommodate the expansion. As seen in FIGS. 3A and 3B, when the user selects the "expand" control 304, all of the sub-processes within the process diagram 106 are expanded and the process diagram 106 is properly formatted.

Figure 4C:
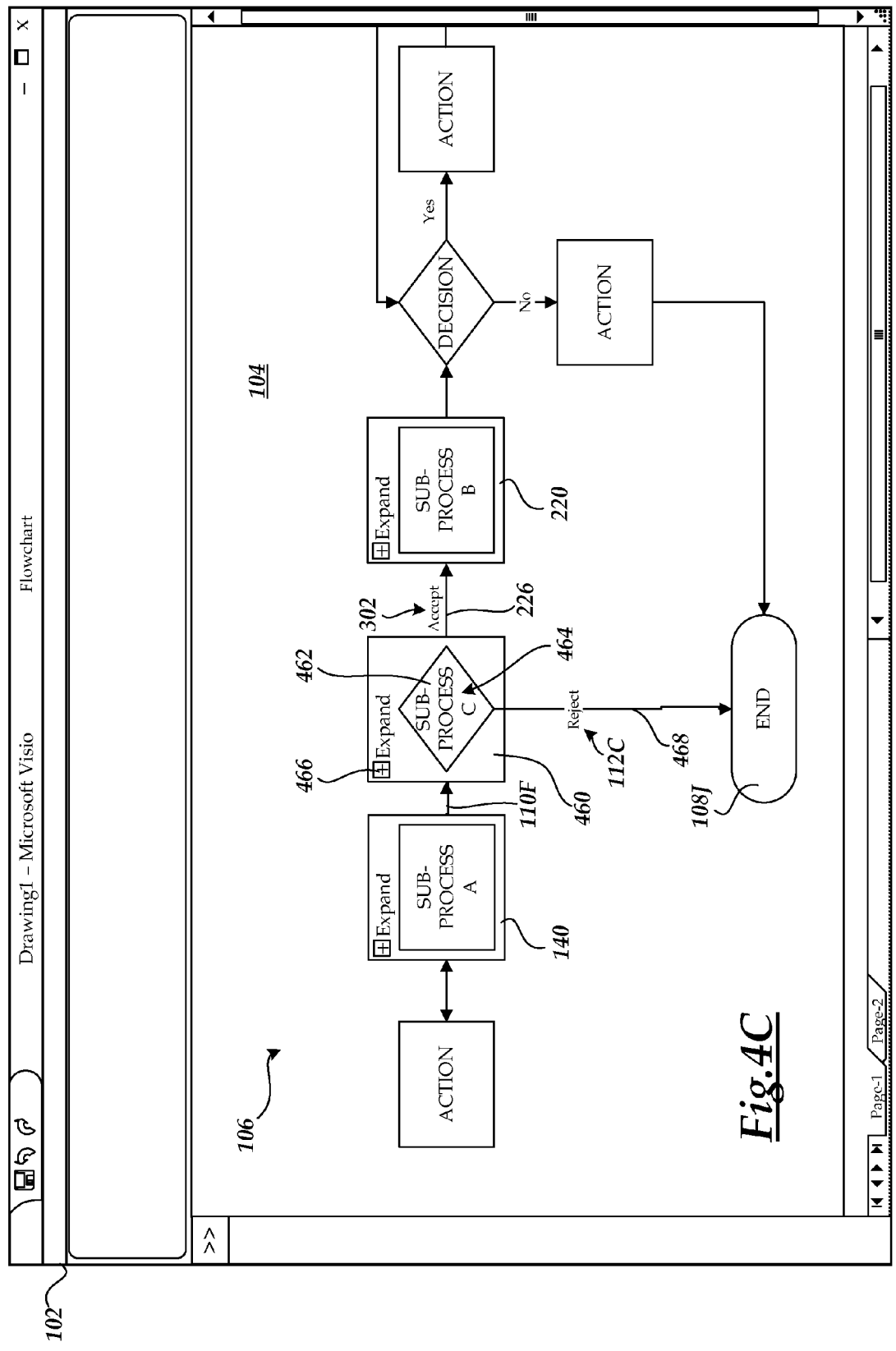

Various embodiments for creating a sub-process from multiple existing process operations within a process diagram have been described. There are times in which the user may decide that a single process operation within a process diagram should be shown in further detail as a sub-process. FIGS. 4A-4C illustrate one embodiment for creating additional process operations to be grouped together as a sub-process and associated with an existing process operation. FIG. 4A shows the process diagram 106 used in the examples described above. Continuing the example, the user determines that the process operation 108E should be shown as a sub-process. To create the required process operations 108 that will define the sub-process, the user first selects the process operation 108E to create a container 402. The user then selects the "create sub-process" control 404 located within the command area 114.

Selecting the "create sub-process" control 404 opens a sub-process workspace in which the user can create the sub-process diagram. Specifically, the diagramming application opens the sub-process diagram page 410 shown in FIG. 4B. The sub-process diagram page 410 includes a workspace 414 for creating the sub-process diagram 412. The diagramming application creates a sub-process creation container 420 within the workspace. The sub-process creation container 420 includes connector anchors 422, 424, and 426 corresponding to the connectors 110F, 110G, and 226 from the process diagram 106. The connector anchors 422, 424, and 426 give the user an object to which sub-process connectors may be connected. Each connector anchor 422, 424, and 426 indicates the direction, whether incoming or outgoing, of the corresponding connector 110F, 110G, and 226 according to which way the anchor is pointing. For example, because the connector anchor 422 is pointing inside the sub-process creation container 420, then the user is aware that the connector 430A that is glued to the connector anchor 422 must be an incoming connector.

The user may create the sub-process diagram 412 within the sub-process creation container 420 in the same manner that the process diagram 106 was created. The sub-process creation container 420 will expand, if necessary, to accommodate a sub-process of any size. According to the example shown, the user creates a sub-process that includes process operations 428A and 428B, as well as connectors 430A-430E. Similar to the process diagram page 102, the sub-process diagram page 410 has a command area 416. To complete the sub-process and to create the corresponding expanded and collapsed containers within the process diagram 106, the user selects the "return" control 418 from the command area 416. After selecting the "return" control 418, the diagramming application will return to the process diagram page 102 from the sub-process diagram page 410. Alternatively, after selecting the "return" control 418, a drop-down menu is presented that includes a "main page" control and individual page controls. Each time that a sub-process diagram page 410 is opened to create a new sub-process, a new page control is provided in the drop-down menu. The user may select any control within the drop-down menu to navigate to the corresponding process or sub-process diagram page. As an example, the user may select the "main page" control to create the sub-process and display it within the process diagram 106.

After returning to the process diagram page 102, as shown in FIG. 4C, the process operation 108E is replaced with a collapsed container 460. The collapsed container 460 includes a collapsed shape 462, which may be labeled with a sub-process name 464. The collapsed container 460 additionally includes an in-diagram "expand" control 466 that when selected, operates to hide the collapsed container 460 and appropriate connectors and to display a corresponding expanded container and appropriate connectors. In the example shown, because the connector 110F remains the only incoming connector to sub-process C from sub-process A, it is connected to the collapsed container 460. Because the aggregate connector 226 continues to represent multiple connectors from sub-process C to sub-process B, the aggregate connector 226 is connected to the collapsed container 460. However, because connectors 430D and 430E are both outgoing connectors from the sub-process C to process operation 108J, the connector 110G is replaced with the aggregate connector 468.

Figure 5:
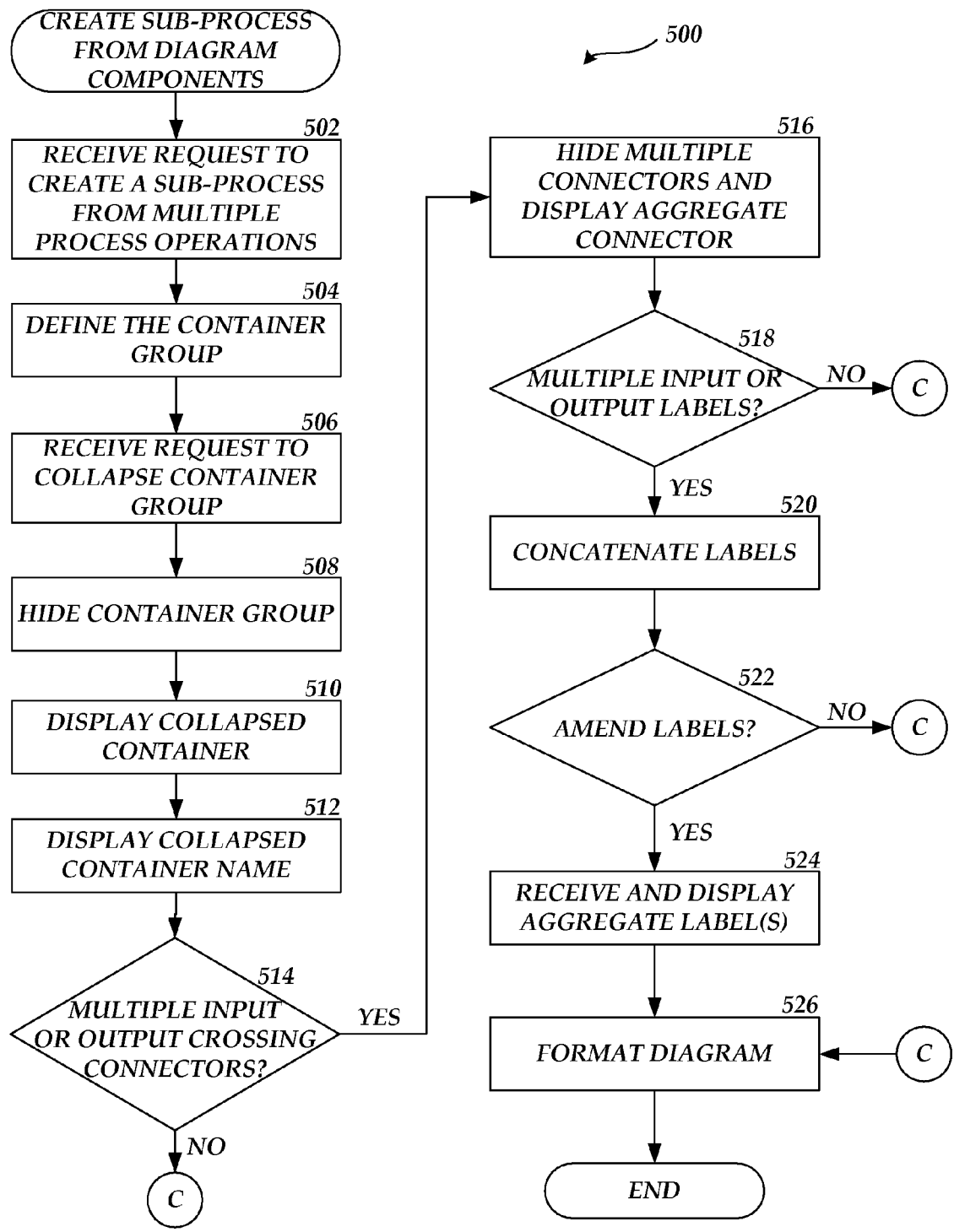
FIG. 5 is a flow diagram showing an illustrative process provided in one implementation described herein for creating a sub-process from multiple process operations of a process diagram.

Turning now to FIGS. 5-7B, additional details will be provided regarding the embodiments presented herein for creating, displaying, and editing sub-processes within a process diagram. In particular, FIG. 5 is a flow diagram showing a routine 500 that illustrates aspects of a process performed by the diagramming application for creating a sub-process from existing process operations within a process diagram 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the diagramming application receives a request to create a sub-process from multiple existing process operations 108 within a process diagram 106. As discussed above, this request may be in the form of a request to group or collapse a container 120 that includes the process operations 108 and corresponding connectors 110 that define the sub-process being created. From operation 502, the routine 500 continues to operation 504, where the diagramming application defines the container group as all process operations 108 and connectors 110 within the container 120. The routine continues to operation 506, where the diagramming application receives a request to collapse the container group. This request may have been received at operation 502 if the request to create the sub-process was a selection of a "collapse" control 126.

From operation 506, the routine 500 continues to operation 508, where the diagramming application hides the container group, including the internal connectors within the container 120. The routine continues from operation 508 to operation 510, where the diagramming application displays a collapsed container 140, which includes a collapsed shape 142, within the process diagram 106. Continuing from operation 510, the routine 500 proceeds to operation 512, where the diagramming application displays a sub-process name 150 within the collapsed shape 142. This name may be input by the user. The routine 500 continues from operation 512 to operation 514, where the diagramming application determines whether there are multiple input crossing connectors or multiple output crossing connectors associated with the container 120.

If there are no multiple crossing connectors traversing into or out of the container 120, then the routine 500 proceeds from operation 514 to operation 526, where the diagramming application formats the process diagram 106 to fill the vacant areas of the workspace 104 created by hiding the container group, and the routine 500 ends. However, if at operation 514, it is determined that there are multiple input or output crossing connectors associated with the container 120, then the routine 500 proceeds to operation 516, where the diagramming application hides the multiple connectors associated with the container group and displays the appropriate aggregate connectors. From operation 516, the routine 500 continues to operation 518, where the diagramming application determines whether there are multiple input or output labels 112 corresponding to an aggregate connector. If there are not multiple input or output labels 112 corresponding to an aggregate connector, then the routine 500 proceeds from operation 518 to operation 526, where the diagramming application formats the process diagram 106 to fill the vacant areas of the workspace 104 created by hiding the container group, and the routine 500 ends.

However, if there are multiple input or output labels 112 corresponding to an aggregate connector, then the routine 500 proceeds from operation 518 to operation 520, where the diagramming application concatenates the labels 112 and separates them by a carriage return. From operation 520, the routine 500 continues to operation 522, where the diagramming application determines whether or not to amend the concatenated label 228. If the diagramming application does not determine that the concatenated label 228 is to be amended, then the routine proceeds from operation 522 to operation 526, where the diagramming application formats the process diagram 106 to fill the vacant areas of the workspace 104 created by hiding the container group, and the routine 500 ends.

However, if the diagramming application receives a selection at operation 522 of the concatenated label 228, then the diagramming application may determine that the concatenated label 228 is to be amended, and the routine proceeds to operation 524, where the diagramming application receives the amendment from the user and replaces the concatenated label 228 with the amendment to create an aggregate label 302. From operation 524, the routine 500 continues to operation 526, where the diagramming application formats the process diagram 106 to fill the vacant areas of the workspace 104 created by hiding the container group, and the routine 500 ends.

Figure 6:
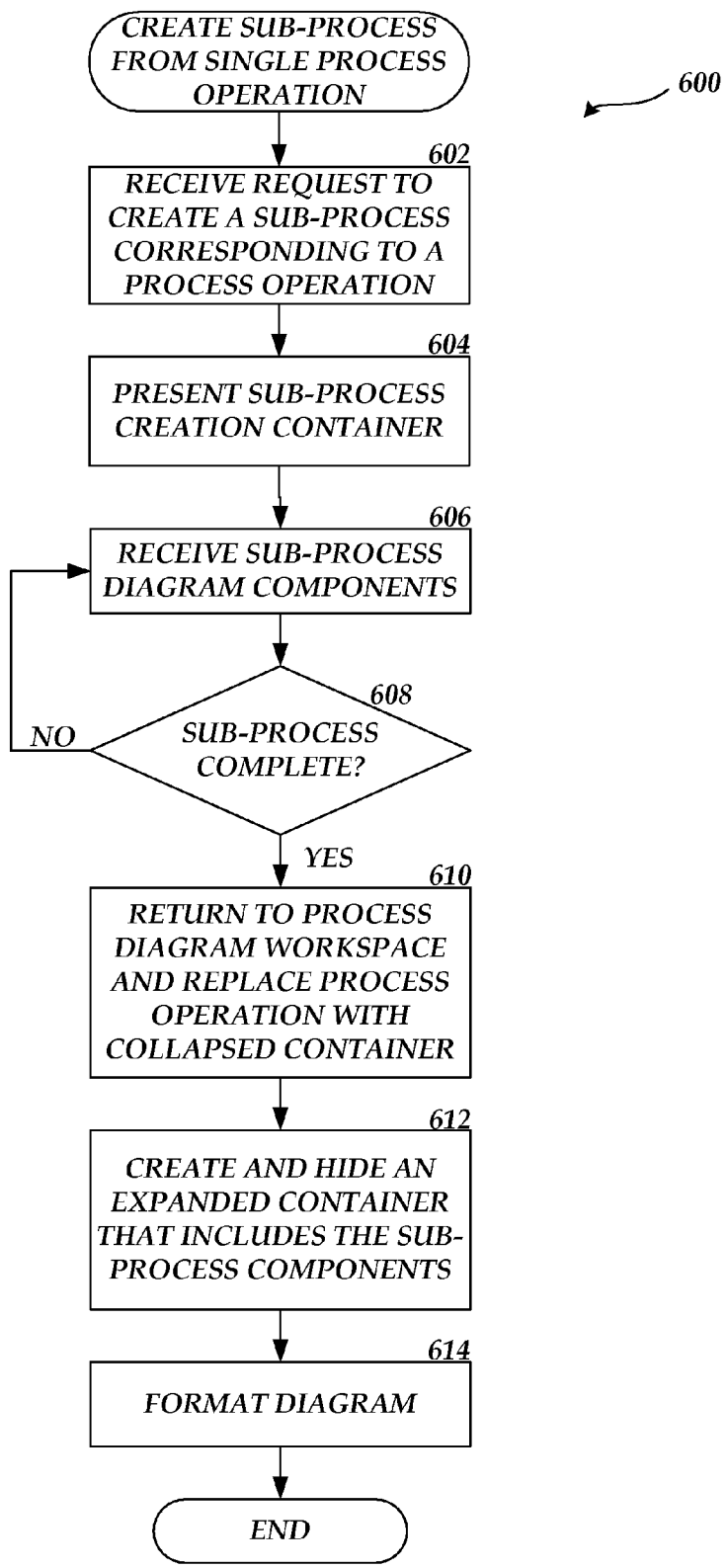
FIG. 6 is a flow diagram showing an illustrative process provided in one implementation described herein for creating a sub-process corresponding to a single process operation within a process diagram.

FIG. 6 is a flow diagram showing a routine 600 that illustrates aspects of a process performed by the diagramming application for creating a sub-process corresponding to a process operation 108 of a process diagram 106. The routine 600 begins at operation 602, where the diagramming application receives a request to create the sub-process corresponding to the process operation 108. As described above, the request may include a selection of the applicable process operation 108 and a subsequent selection of a "create sub-process" control 404 or similar selection control. From operation 602, the routine 600 continues to operation 604, where the diagramming application presents a sub-process creation container 420, in which the sub-process components are to be created. It should be appreciated that the sub-process creation container 420 may be located on a sub-process diagram page 410 that is separate from the process diagram page 102 on which the process diagram 106 is displayed. Alternatively, the sub-process creation container 420 may be located within the workspace 104 of the process diagram page 102.

The routine 600 continues from operation 604 to operation 606, where the diagramming application receives sub-process diagram components. The user creates the process operations 428 associated with the sub-process being created, as well the corresponding connectors 430. From operation 606, the routine 600 continues to operation 608, where the diagramming application determines whether the sub-process creation process is complete. As discussed above, according to one embodiment, the sub-process creation process is complete when the user selects a "return" control 418. If the diagramming application determines that the sub-process creation process is not complete, then the routine 600 returns to operation 606, where sub-process diagram components are received until the sub-process creation process is complete.

However, if at operation 608, the diagramming application determines that the sub-process creation process is complete, then the routine 600 continues to operation 610, where the diagramming application returns the user to the process diagram workspace 104 and replaces the process operation 108 with a collapsed container 460 and appropriate connectors. From operation 610, the routine 600 continues to operation 612, where the diagramming application creates and hides an expanded container 320 that encompasses the sub-process components. The routine 600 continues to operation 614, where the diagramming application formats the process diagram 106 to accommodate the collapsed container 460. Because the collapsed container 460 is substantially similar in size compared to the process operation 108E that it replaces, minimal formatting is likely necessary. After operation 614, the routine 600 ends.

Figure 7A:
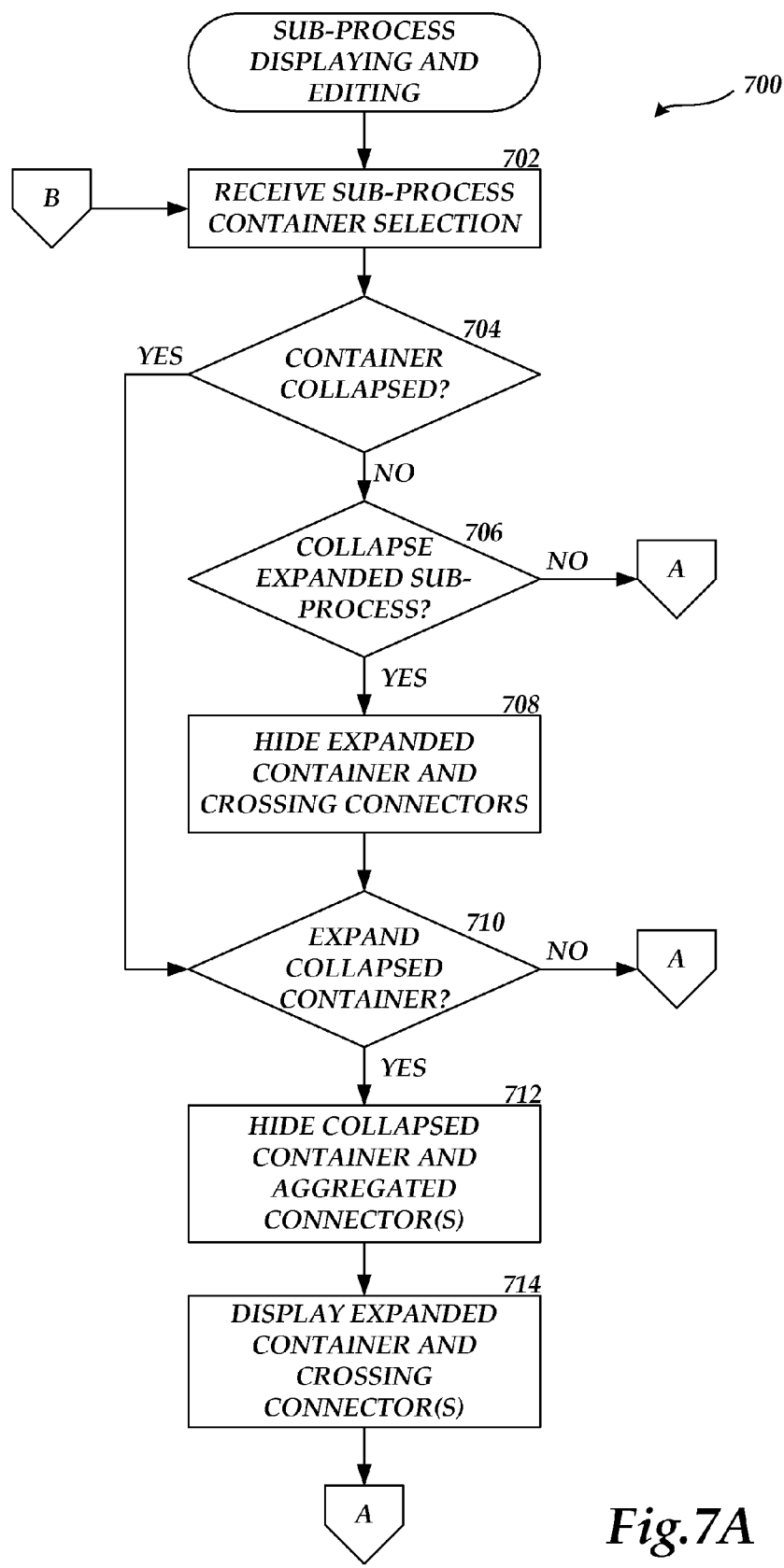
FIGS. 7A-7B are flow diagrams showing an illustrative process provided in one implementation described herein for displaying and editing a sub-process within a process diagram.
Figure 7B:
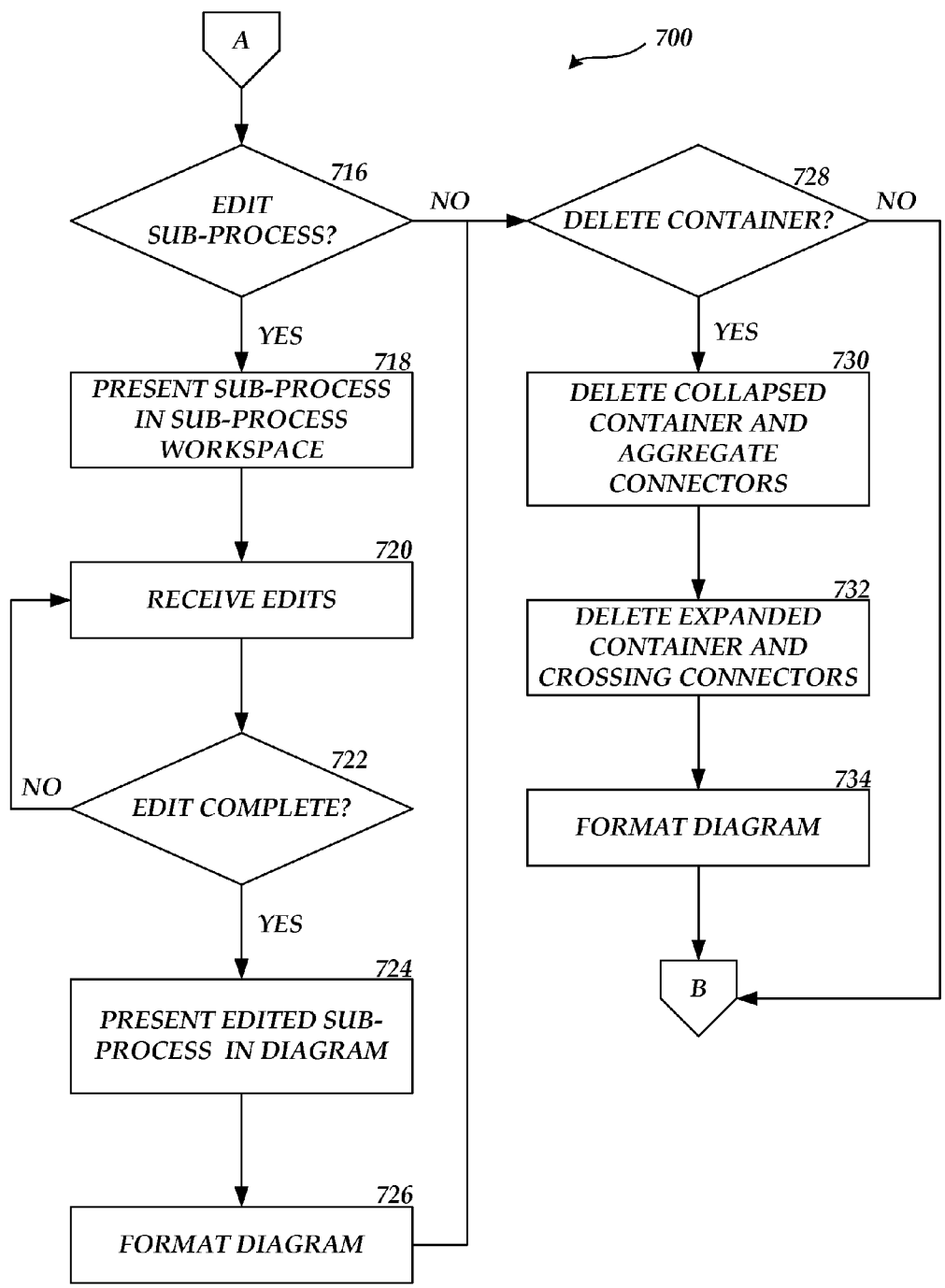

FIGS. 7A and 7B are flow diagrams showing a routine 700 that illustrates aspects of a process performed by the diagramming application for displaying and editing a sub-process within a process diagram 106. The routine 700 begins at operation 702, where the diagramming application receives a selection of a sub-process container. The user may have selected an expanded container 210 or a collapsed container 140. At operation 704, the diagramming application makes a determination as to whether the selected sub-process container is a collapsed container 140. If the diagramming application determines that the container is a collapsed container 140, then the routine proceeds to operation 710 and continues as described below. However, if at operation 704, the diagramming application determines that the container is an expanded container 210 rather than a collapsed container 140, then the routine continues to operation 706, where a determination is made as to whether a "collapse" control 126 or an in-diagram "collapse" control 214 has been selected. If a collapse request has not been received, then the routine 700 proceeds to operation 716 and continues as described below. However, if at operation 706, the diagramming application determines that a collapse request has been received, then the routine 700 continues to operation 708, where the diagramming application hides the expanded container 210 and corresponding crossing connectors 110.

From operation 708, the routine 700 continues to operation 710, where the diagramming application determines whether an "expand" control 304 or an in-diagram "expand" control 146 as been selected. If an expand request has not been received, then the routine 700 proceeds to operation 716 and continues as described below. However, if at operation 710, the diagramming application determines that an expand request has been received, then the routine 700 continues to operation 712, where the diagramming application hides the collapsed container 140 and corresponding aggregate connectors 144. The routine 700 continues from operation 712 to operation 714, where the diagramming application displays the expanded container 210 and corresponding crossing connectors 110. From operation 714, the routine 700 continues to operation 716, where the diagramming application determines whether a process operation 108 or a connector 110 that is part of a sub-process has been selected for editing.

If a component of a sub-process has not been selected for editing, then the routine 700 proceeds to operation 728 and continues as described below. However, if at operation 716, the diagramming application determines that a component of a sub-process has been selected for editing, then the routine 700 continues to operation 718, where the diagramming application presents the sub-process in a sub-process workspace for editing. It should be appreciated that the sub-process workspace may be in a separate sub-process diagram page 410 or may be within the process diagram 106 on the process diagram page 102. From operation 718, the routine 700 continues to operation 720, where the diagramming application receives the edits. The routine continues to operation 722 and a determination is made as to whether the editing has been completed. If the diagramming application determines that the editing is not complete, then the routine 700 returns to operation 720 and continues until editing is complete. However, if at operation 722, it is determined that the editing is complete, then the routine 700 continues to operation 724, where the diagramming application presents the edited sub-process in the process diagram 106.

The routine 700 continues to operation 726, where the diagramming application formats the process diagram 106 to accommodate the edits to the sub-process. From operation 726, the routine 700 continues to operation 728, where the diagramming application determines whether a request to delete a collapsed container 140 or an expanded container 210. If a request to delete a container has not been received, then the routine 700 returns to operation 702 and continues as described above. However, if at operation 728, it is determined that a delete request has been received, then the routine 700 continues to operation 730, where the diagramming application deletes the collapsed container 140 and corresponding aggregate connectors. The routine 700 continues from operation 730 to operation 732, where the diagramming application deletes the corresponding expanded container 210 and associated crossing connectors. The process diagram 106 is then formatted at operation 734 to fill in the vacant space created by the delete action. The routine 700 then returns to operation 702 and continues as described above.

Figure 8:
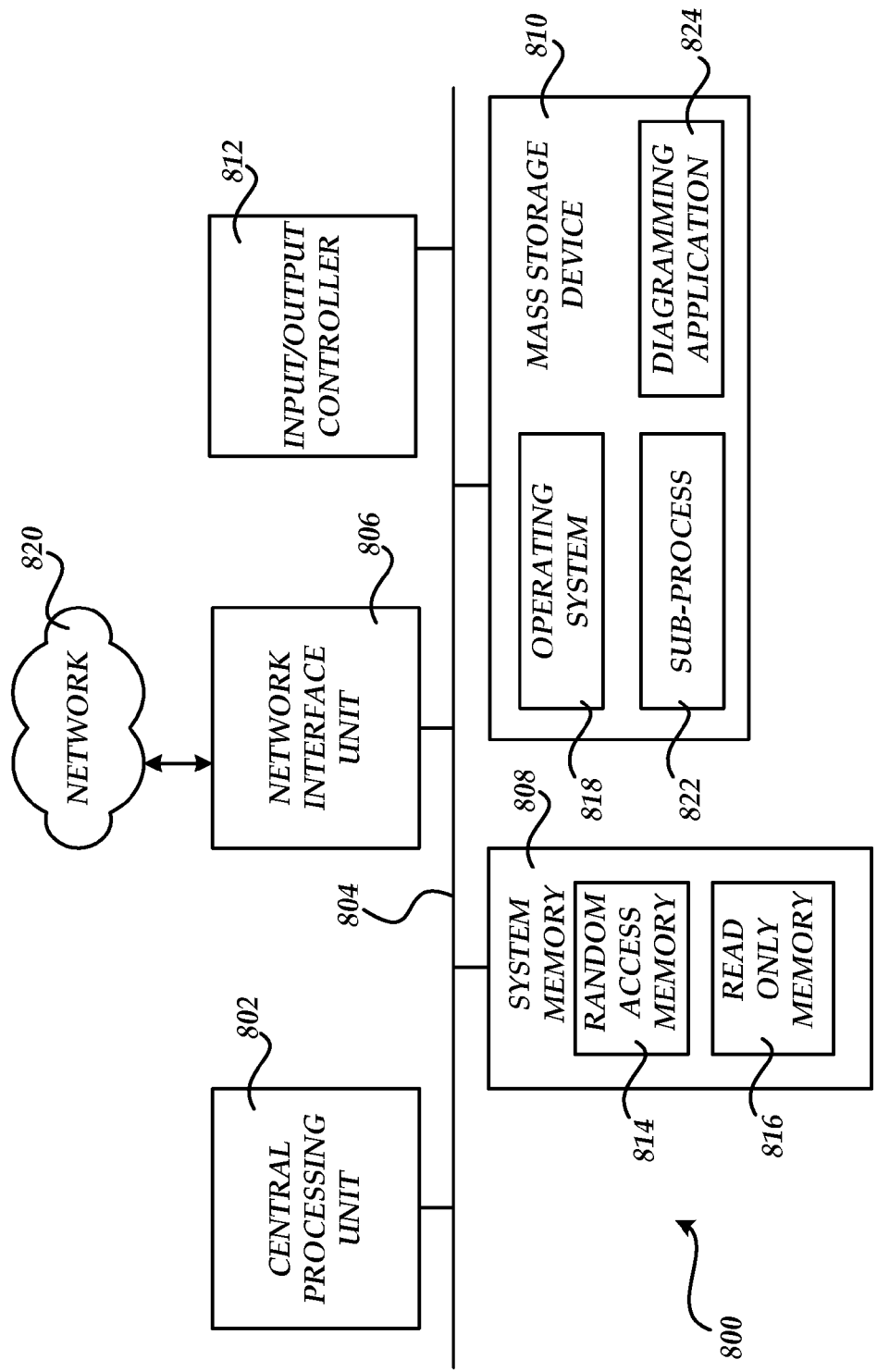
FIG. 8 is a computer architecture diagram showing an illustrative computer hardware and software architecture for a computing system capable of implementing the embodiments presented herein.

FIG. 8 shows an illustrative computer architecture for a computer 800 capable of executing the software components described herein for creating, displaying, and editing sub-processes within a process diagram. The computer architecture shown in FIG. 1 illustrates a conventional desktop, laptop computer, or server computer and may be utilized to embody any aspects of the computer program described herein.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which will be described in greater detail below.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). It should be appreciated that the user input operations described herein as being performed with a mouse may be performed with a keyboard, electronic stylus, or other suitable user input device. Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store a diagramming application 824. Additionally, the mass storage device 810 may operate as a repository for sub-processes 822. When a user creates a sub-process 822 using any method described above, the sub-process 822 may be stored in a central repository where the user or other users may import it into other process diagrams 106 as desired. When importing a sub-process 822 from the mass storage device 810, or from any local or remote data repository, a corresponding expanded container and collapsed container is inserted into the desired process diagram 106 and hidden or displayed accordingly.

Based on the foregoing, it should be appreciated that technologies for creating, displaying and editing a sub-process within a process diagram are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for creating a sub-process within a process diagram, the method comprising:
    receiving a request to define a plurality of process operations within the process diagram as the sub-process;
    creating a collapsed container representing the sub-process in a collapsed display state;
    creating an expanded container comprising the plurality of process operations;
    grouping the plurality of process operations and any associated internal connectors;
    hiding the group of process operations and associated internal connectors;
    displaying the collapsed container within the process diagram;
    determining if a crossing connector is connected to at least one of the group of process operations;
    in response to determining that the crossing connector is connected to the at least one of the group of process operations, hiding the crossing connector, displaying an aggregate connector between the collapsed container and a diagram process operation, and displaying an indication of a quantity of crossing connectors the aggregate connector represents; and
    hiding the expanded container.

2. The method of claim 1, wherein receiving the request to define the plurality of process operations within the process diagram as the sub-process comprises:
    receiving a selection of the plurality of process operations within the process diagram;
    receiving a selection of a sub-process control; and
    as a result of receiving the selection of the sub-process control, grouping the plurality of process operations as the sub-process.

3. The method of claim 1, wherein the collapsed container representing the sub-process in the collapsed display state comprises a representation of one process operation.

4. The method of claim 3, wherein the collapsed container further comprises a selectable expand control operative to expand the collapsed container within the process diagram while hiding the collapsed container.

5. The method of claim 1, further comprising concatenating a plurality of labels associated with a plurality of crossing connectors into a label associated with an aggregate connector.

6. The method of claim 5, further comprising formatting the process diagram after hiding the group of process operations and associated internal connectors and displaying the collapsed container to fill any vacant space created by hidden process operations.

7. The method of claim 1, wherein the expanded container comprises a selectable collapse control to collapse the expanded container, wherein collapsing the expanded container comprises displaying the collapsed container within the process diagram while hiding the expanded container.

8. A method for creating a sub-process within a process diagram, the method comprising:
    in response to receiving a request to create a sub-process associated with a process operation of the process diagram, presenting a sub-process creation workspace comprising at least one connector anchor associated with the process operation;
    identifying a plurality of sub-process operations connected to the at least one connector anchor;
    creating an expanded container comprising the plurality of sub-process operations;
    creating a collapsed container that represents the sub-process associated with the process operation;
    displaying the collapsed container within the process diagram while hiding the expanded container;
    determining if a crossing connector is connected to the at least one connector anchor;
    in response to determining that the crossing connector is connected to the at least one connector anchor, hiding the crossing connector and displaying an aggregate connector between the collapsed container and a diagram process operation; and
    displaying an indication of a quantity of crossing connectors for which each aggregate connector represents.

9. The method of claim 8, wherein receiving the request to create the sub-process associated with the process operation of the process diagram comprises receiving a selection of the process operation and receiving a selection of a sub-process creation control.

10. The method of claim 8, wherein creating the collapsed container that represents the sub-process associated with the process operation and displaying the collapsed container within the process diagram while hiding the expanded container comprises:
    grouping the plurality of sub-process operations and any associated internal connectors;
    hiding the group of process operations and associated internal connectors;
    displaying the collapsed container;
    determining if an incoming crossing connector is connected to the at least one connector anchor;
    determining if an outgoing crossing connector is connected to the at least one connector anchor;
    in response to determining that the incoming crossing connector is connected to the at least one connector anchor, hiding the incoming crossing connector and displaying an incoming aggregate connector between the collapsed container and a diagram process operation; and
    in response to determining that the outgoing crossing connector is connected to the at least one connector anchor, hiding the outgoing crossing connector and displaying an outgoing aggregate connector between the collapsed container and a diagram process operation.

11. The method of claim 10, wherein displaying the indication further comprises displaying an indication of a quantity of crossing connectors for which each incoming aggregate connector and outgoing aggregate connector represents.

12. The method of claim 10, further comprising storing the expanded container and the collapsed container in a sub-process repository for importing into any process diagram.

13. The method of claim 10, further comprising concatenating a plurality of labels associated with a plurality of crossing connectors into a label associated with an aggregate connector.

14. The method of claim 8, further comprising formatting the process diagram after hiding the group of process operations and associated internal connectors and displaying the collapsed container to fill any vacant space created by hidden process operations.

15. The method of claim 8, wherein creating the expanded container comprises creating the expanded container with a selectable collapse control selectable for collapsing the expanded container.

16. A computer storage medium comprising computer-executable instructions that, when executed by a computer, cause the computer to:
   present a sub-process creation workspace comprising at least one connector anchor associated with a process operation of a process diagram, in response to receiving a request to create the a sub-process;
   identify a plurality of sub-process operations connected to the at least one connector anchor;
   create an expanded container comprising the plurality of sub-process operations;
   create a collapsed container that represents the sub-process associated with the process operation;
   display the collapsed container within the process diagram while hiding the expanded container;
   determine if a crossing connector is connected to the at least one connector anchor;
   in response to determining that the crossing connector is connected to the at least one connector anchor, hide the crossing connector and display an aggregate connector between the collapsed container and a diagram process operation; and
   display an indication of a quantity of crossing connectors for which each incoming aggregate connector and outgoing aggregate connector represents.

17. The computer storage medium of claim 16, wherein receiving the request to create the sub-process associated with the process operation of the process diagram comprises receiving a selection of the process operation and receiving a selection of a sub-process creation control.

18. The computer storage medium of claim 16, further comprising instructions that, when executed by the computer, cause the computer to:
   group the plurality of sub-process operations and any associated internal connectors;
   hide the group of process operations and associated internal connectors;
   display the collapsed container;
   determine if an incoming crossing connector is connected to the at least one connector anchor;
   determine if an outgoing crossing connector is connected to the at least one connector anchor;
   hide the incoming crossing connector and displaying an incoming aggregate connector between the collapsed container and a diagram process operation, in response to determining that the incoming crossing connector is connected to the at least one connector anchor; and
   hide the outgoing crossing connector and displaying an outgoing aggregate connector between the collapsed container and a diagram process operation, in response to determining that the outgoing crossing connector is connected to the at least one connector anchor.

19. The computer storage medium of claim 18, further comprising computer-executable instructions that, when executed by the computer, cause the computer to concatenate a plurality of labels associated with the plurality of crossing connectors into a label associated with an aggregate connector.

20. The computer storage medium of claim 16, further comprising computer-executable instructions that, when executed by the computer, cause the computer to:
   display the expanded container within the process diagram; and
   hide the collapsed container.

* * * * *